United States Patent [19]

Duncan

[11] 4,390,159
[45] Jun. 28, 1983

[54] SNAP-ON SHUT OFF VALVE

[76] Inventor: Ronnie J. Duncan, 219 Lake Arbor, Palm Springs, Fla. 33461

[21] Appl. No.: 257,753

[22] Filed: Apr. 27, 1981

[51] Int. Cl.³ .................. F16K 51/00; F16L 19/00
[52] U.S. Cl. .................................. 251/148; 137/522; 137/541; 137/DIG. 2; 285/340; 285/348
[58] Field of Search ............... 137/DIG. 2, 522, 528, 137/541, 539; 285/DIG. 3, 340, 348, 321, 373, 383

[56] References Cited

U.S. PATENT DOCUMENTS

| 620,936 | 3/1899 | Kunzer | 137/541 |
|---|---|---|---|
| 1,026,564 | 5/1912 | Crawford | 137/DIG. 2 |
| 1,093,117 | 4/1914 | Deiller | 137/DIG. 2 |
| 1,675,979 | 7/1928 | Laird | 137/DIG. 2 |
| 2,691,537 | 10/1954 | Bashark | 285/348 |
| 3,483,888 | 12/1969 | Wurzel | 137/539 |
| 3,779,583 | 12/1973 | Nuber | 285/373 |
| 4,146,254 | 3/1979 | Turner et al. | 285/383 |

Primary Examiner—A. Michael Chambers
Attorney, Agent, or Firm—Malin & Haley

[57] ABSTRACT

A snap-on, easily removable, fluid shut off valve (with pipe and interlocking member) that is useful as a low cost, primary turn off valve for domestic and commercial fluid fixtures and is quickly installed by manual snap-on between the inlet fluid supply and the supply pipe to conventional fixtures such as faucets or the like. The valve comprises a rigid housing having an inlet chamber and an outlet chamber, and a cross-over passage separating the first and second chambers that houses a moveable ball or poppet valve member that is held in the cross-over chamber by a spring retainer. A mechanical plunger or cam device (operable from the exterior of the housing) is disposed within the outlet chamber for contacting and pushing the ball or poppet valve member against the spring retainer, away from the valve seat, to open the valve. The first and second chamber openings receive spiral-shaped spring pipe end retaining members, each having an inside diameter smaller than the outside diameter of the inserted pipe mounted between level bushings. Each spiral-shaped retaining member has radial segments that deform in the direction of the pipe inserted that interlocks the pipe end in each chamber. Cooperating fluid seals prevent leakage.

1 Claim, 9 Drawing Figures

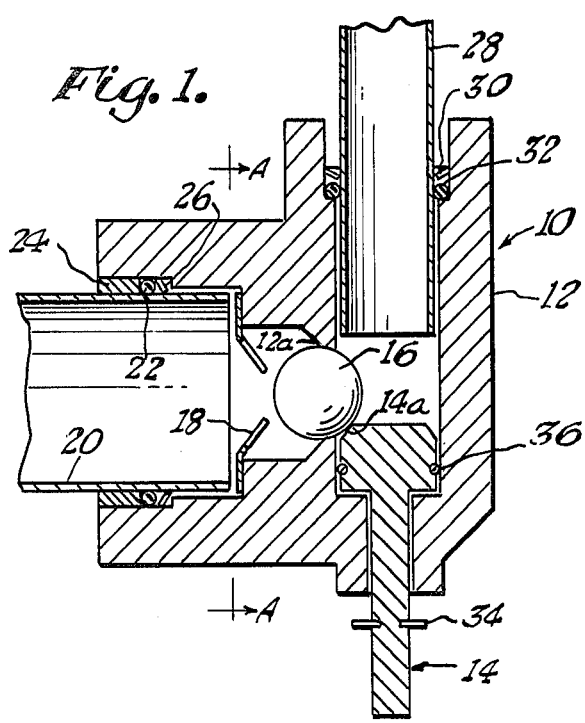
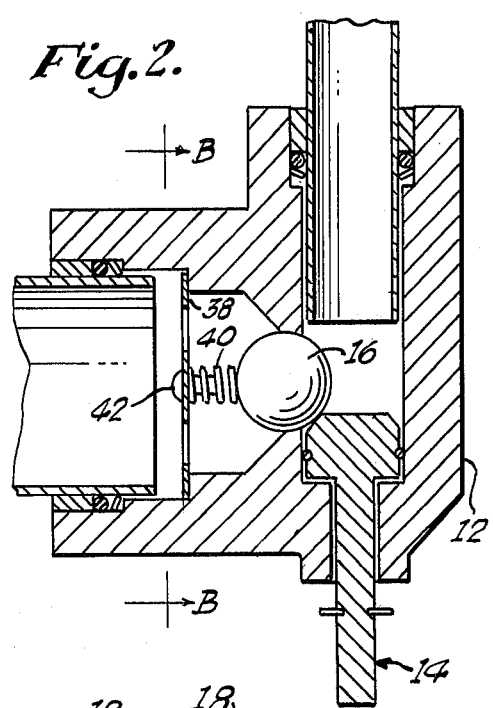
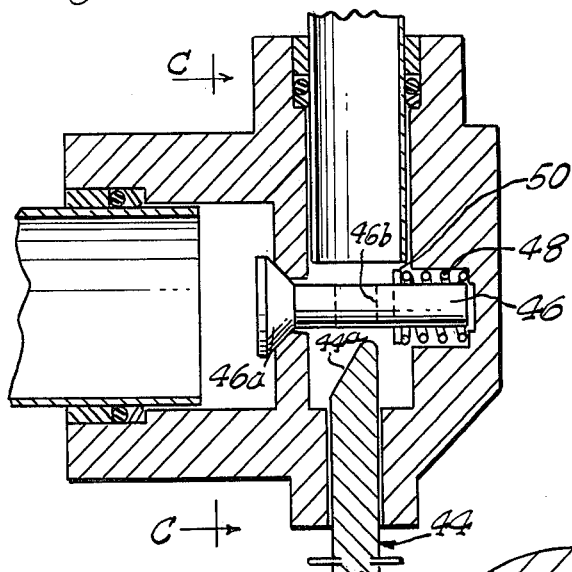
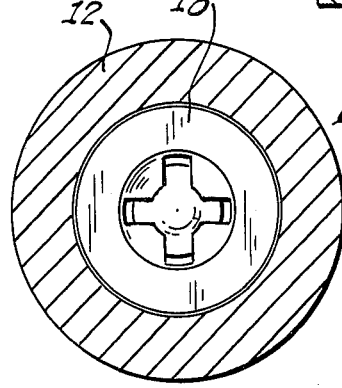
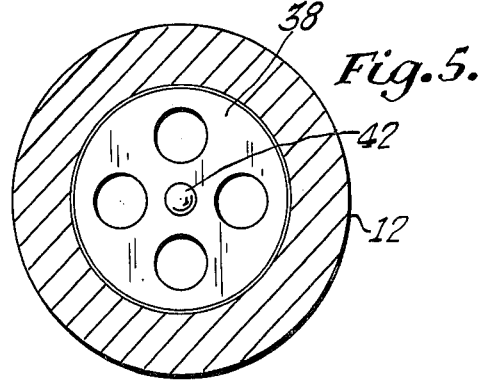
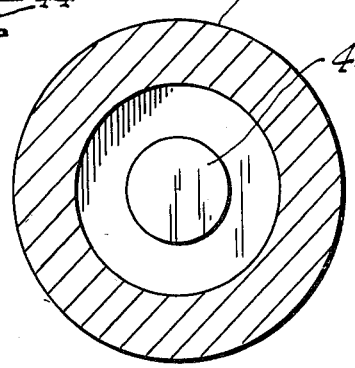

SNAP-ON SHUT OFF VALVE

BACKGROUND OF THE INVENTION

This invention relates generally to a snap-on (removeable) valve that saves installation time, and specifically to an easily installed fluid valve that is useful for shutting off the inlet fluid supply to a conventional fixture found in domestic or commercial fluid application. Each inlet and outlet opening of the valve housing (that connect to the system pipes) receives a pipe end spiral retaining member that interlocks the pipe end to the valve housing during manual insertion of the pipe end into the valve housing opening. The improved valve disclosed herein is operable in either an open or closed condition, or in an infinite number of intermediate positions which regulate the amount of fluid flowing therethrough.

Shut off valves are conventionally disposed either on the inlet fluid supply or on a fixture to provide for shut off of the inlet fluid supply to the fixture. It is quite common to find a shut off valve coupled in any fluid supply line.

In the past, many such shut off valves have manually rotated, threaded stems with packing elements for sealing, such conventional valves being relatively expensive to manufacture due to the machinery required. Also installation costs of such conventional shut off valves has become expensive due to the high cost of labor and time consuming fittings. Such valves were also difficult to open against packing pressure. Once installed, the valves were difficult to remove.

The present invention provides many advantages over the conventional shut off valves discussed above, that greatly reduces the valve fabrication costs while at the same time lowering installation costs, without sacrificing operability or reliability. Further, the improved shut off valve disclosed herein, provides a fail-safe operation in that the inlet fluid supply and/or spring pressure acts to seal the valve in a closed position. Other features of the valve disclosed herein are that it has components that can be simply fabricated and easily assembled (all molded elements) and does not require machining after the molding process. The invention further includes novel easily removable snap-on fittings and seals for quickly installing and removing the valve in the supply line.

SUMMARY OF THE INVENTION

A low cost, easily installed, yet easily removed shut off fluid valve and pipe end retainer for use on the inlet fluid supply pipe of domestic or commercial fixtures and the like, said valve comprising a rigid housing having a first chamber and a second chamber, said first chamber being coupled to the inlet fluid supply, and the second chamber being the outlet supply to the fixture, and a cross-over passage providing a valve seat in fluid communication between said first chamber and said second chamber. The valve member engages the seat under fluid pressure and spring tension and is mechanically moved from the seat by an actuating lever or cam.

The valve member may be either of a ball or poppet type. In the preferred embodiment, a ball member is described. However, a poppet type valve could be used to replace the ball valve described below.

The inlet and outlet chambers house spiral spring pipe-end retainers in conjunction with level bushings and appropriate conventional fluid seals that insure interlock between the pipe-end and the valve housing just by manual insertion of the pipe-end into the chamber opening. In the preferred embodiment, the spring retainer is a spiral-shaped rigid metal spring having inner radial slots forming segments that deform inwardly (in the direction of pipe movement) due to the larger diameter of the inserted pipe through the inside smaller diameter of the retainer. The retainer segments once deformed inwardly, firmly grip a portion of the inserted pipe exterior surface, preventing reciprocal movement of the pipe end from the housing in the direction of fluid force. Removal of the pipe is accomplished by turning the pipe in the direction of the spiral spring axis, effecting a screw off valve. An O-ring fluid seal is mounted adjacent the level bushing.

The cross-over passage (terminating in a valve seat) in the housing may be coaxial with the inlet supply chamber and is shaped and sized to house a valve member such as a ball. The passage terminates at one end in an annular opening (smaller than the ball diameter) which forms the valve seat for the ball that links the first and second chambers in fluid communication. The cross-over passage is also sized to house the ball or poppet valve member in a plurality of positions between fully opened and closed (ball seated). A valve member retainer which is mounted in the cross-over passage presses against the ball valve member under tension at all times, tending to force the valve member against the annular valve seat. Once seated, inlet fluid pressure and/or spring pressure keeps the valve member in place.

A valve actuator for turning the valve ON or OFF, such as a plunger or cam is disposed in the second chamber. The head of the valve actuator is positioned either through cam rotation or plunger reciprocal movement to move the ball or poppet valve member away from the seat against the retainer spring tension and fluid pressure. The actuator extends outside the housing for manual operation and is sealed through the valve housing.

The mechanical actuator is sized and shaped to operate in many positions relative to the valve seat and the ball or poppet valve member disposed therein to hold the valve member away from the valve seat to allow fluid to flow through the valve seat. The plunger head or cam can be configured such that incremental movement of the actuator moves the ball or poppet member incremental relative to the valve seat to allow for variable flow.

It is an object of this invention to provide a reliable, low cost shut off valve that can be easily installed, without threaded fittings or solder, and removed easily.

It is another object of this invention to provide a highly efficient snap-on shut off valve that utilizes positive incoming fluid pressure to seal the valve in the off position thereby providing fail safe operation.

And yet still another object of this invention is to provide an improved shut off valve that may be used for faucets and the like that can be manufactured with a unitary housing at low cost and that eliminates the need for costly seals.

In accordance with these and other objects which will be apparent hereinafter, the instant invention will now be described with particular reference to the accompanying drawings.

BRIEF DESCRIPTION OF THE DRAWINGS

FIG. 1 shows a side elevational view in cross section of the shut off valve of the present invention in a primary embodiment.

FIG. 2 shows an alternate embodiment of the shut off valve of the present invention in a side elevated view in cross section.

FIG. 3 shows yet another alternate embodiment of the present invention shown in a side elevational view in cross section.

FIG. 4 shows a view in cross section along line A—A of FIG. 1.

FIG. 5 shows a view in cross section along line B—B shown in FIG. 2.

FIG. 6 shows a view in cross section along line C—C of FIG. 3.

PREFERRED EMBODIMENT OF THE INVENTION

Figure 7:
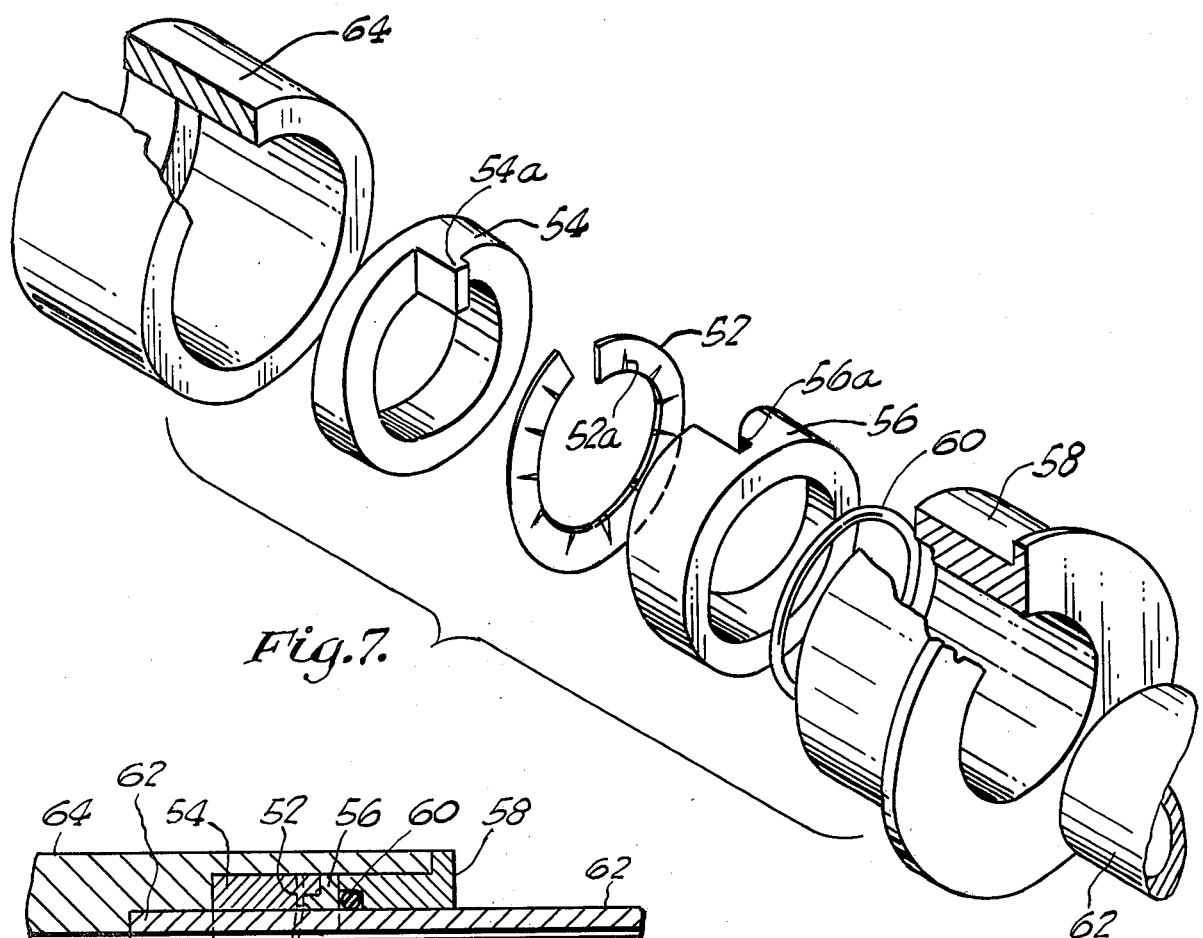
FIG. 7 shows an exploded fragmentary view of the spring retaining member for affixing one pipe-end to the valve chamber in a perspective view.

FIG. 1 shows one embodiment of the present invention generally at 10 comprised of a housing 12 having an inlet chamber on one side that receives inlet fluid pipe or conduit 20 that is sealed in the inlet chamber by a O-ring seal 22 and has an annular retainer 26 mounted therebehind. Element 24 acts to hold the O-ring seal in. This provides for sealing against fluid leakage on the inlet or high pressure side of the device. Retainer 26 provides for snap-on operation and is described in greater detail below.

The outlet side of the valve housing 12 includes pipe or conduit 28 disposed in an outlet passage which is substantially perpendicular to the inlet passage. An O-ring seal 32 and an annular retainer 30 are mounted around pipe 28. A passage 12a is presented between the inlet passage and the outlet passage that acts as a seat for ball valve 16. Note that in the closed position (as shown) the ball 16 is pressed against the seat 12a by fluid pressure in the inlet chamber from the inlet supply. Element 18 acts as a spring retainer to prevent the ball 16 from being removed when plunger 14 is pushed upwardly forcing ball 16 back away from the ball seat against the spring retainer 18.

The plunger 14 that opens and closes the valve includes a stop 34 to prevent further inward movement of the plunger after it has pressed the ball away from the valve seat. The plunger 14 further includes an O-ring seal 36 to prevent leakage from the outlet passage.

The housing 12 may be readily fabricated from plastic or metal and conventional molding techniques. The valve 10 may be readily installed because of the snap-on retainers elements 26 and 30 which prevent removal of the pipe ends once in place in the valve housing.

FIGS. 2 and 5 show an alternate embodiment in which the inside spring retainer 18 (shown in FIG. 4) is replaced with a disc like plate having four apertures and a pin 42 which holds a spring 40 that engages the ball 16. The rest of the operation is the same as that described for the valve 10 in FIG. 1.

FIGS. 3 and 6 show yet another alternate embodiment of the present valve in which the ball valve member is replaced by a poppet valve 46 that is supported by spring 48 and a retainer 50 fixed in the housing 12 in the outlet passage with the head of the poppet valve 46a being disposed across the valve seat. The spring 48 exerts poppet valve 46 closing force through washer 46c attached to the end of the poppet valve. The plunger 44 has angled (tapered) end surface that fits into a passage 46b in poppet valve 46. Note that the surface 44A overlap the outside edge of passage 46B such that when the plunger is depressed inwardly toward poppet valve 46 surface 44a will engage the inside passage forcing poppet valve head 46a away from the valve seat.

FIG. 7 shows the snap-on spring retainer utilized with the present invention that allows for easy installation by merely manually joining together the valve and the pipe-end. Shown in FIG. 7 is a conduit opening 64 which represents the valve housing itself. A pair of spiral bushings 54 and 56 have bevelled surfaces that take a spring retaine 52 having slots 52a and hold the spring retainer 52 between the bushings 54 and 56 in a spiral shape. Bushings 54 and 56 lock together by a male flange 54a which projects into a female slot 56a holding bushings together. The pipe 62 which is interlocked into the valve chamber 64 has an outer diameter that is slightly larger than the inner diameter of the spring arm or retaining member 52.

In addition to the spring retainer 52 the bevel bushings 54 and 56, the interlock includes an O-ring 60 and and O-ring bushing 58 which has a recessed portion for holding the O-ring 60 in such a way that the joint is properly sealed to prevent fluid leakage.

Figure 8:
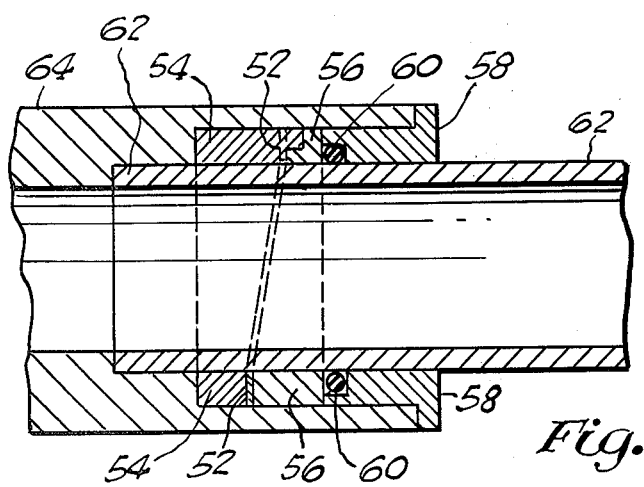
FIG. 8 shows a side elevational view non-exploded of the device shown in FIG. 7.
Figure 9:
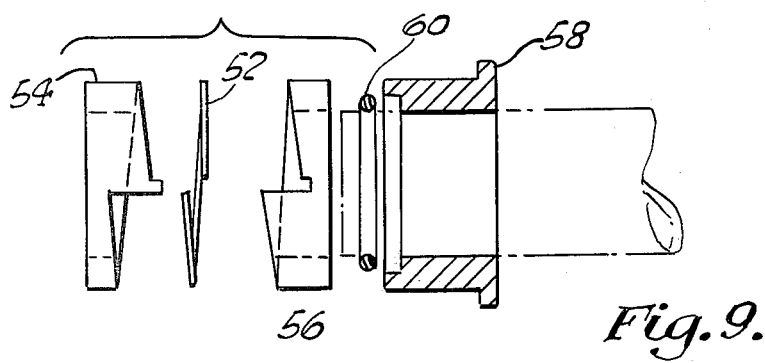
FIG. 9 shows a schematic exploded side elevational view showing the spacial relationship between the spring retaining member and the beveled bushings.

Referring now to FIGS. 8 and 9 the joint is shown such that the pipe 62 has been forced all the way into the recessed chamber of housing 64 in the locked position. In this position the pipe periphery has forced portions of the spring retainer 52 into such a position as to resist fluid movement and separation of the valve housing 64 and the pipe 62. Note that because of the position of the spring retainer 52 and the utilization of plastic pipe (PVC) when the pipe-end 62 is forced into the joint it will contact the spring retainer along its outer surface which can cause some gauging. However, the O-ring 60 is located behind such a position so that the surface area of pipe 62 has not been scarred to in any way affect the seal around the O-ring. This spacial relationship is shown more clearly in FIG. 9.

Note however though because of the spiral shape of the retaining member the pipe-end 62 can be removed from the valve housing 64 by rotation much like a threaded screw.

FIG. 9 emphasizes the spiral or bevelled nature of bushings 54 and 56 along their contact surfaces that engage the spring retainer 52 in its operable position. These force the spring retainer 52 to remain in a spiral position and allow for the threaded removal of the device. The bushings and the O-ring bushing may also be mounted additionally with a suitable adhesive.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. A fluid shut-off snap-on valve that can be fabricated at low cost and is readily installed in a fluid supply line comprising:
- a rigid housing, said housing having a first chamber and a second chamber, and a passage disposed between said first chamber and said second chamber allowing fluid communication therebetween;
- a valve member positionable within said housing passage;
- means for retaining said valve member in said housing passage disposed in said housing passage;
- a valve seat forming an opening between said passage and said second chamber, said valve member being engageable with said valve seat to seal said inlet passage;
- means coupled through said housing for moving said valve member between a first position and a second position in said passage, said first and second positions defining closed and open positions of said valve, respectively, whereby inlet water pressure acts to force said valve member against said valve seat to said first position; and
- spiral-shaped means coupled in said first and second chambers for retaining a pipe end to prevent dislodging of said pipe end, once it is positioned within said first and second chamber said retaining means further including spiral-shaped retaining member having an outside diameter substantially equal to said inlet and outlet chambers, said spiral-shaped member having an internal aperture, the diameter of which is slightly smaller than the outside diameter of the pipe end to be connected, said retaining member having at least one radial slot along the inner portion of said aperture, said slot forming deformable segments for interlocking said pipe end to said valve housing.

* * * * *